(12) United States Patent
Rothschild et al.

(10) Patent No.: US 8,694,441 B1
(45) Date of Patent: Apr. 8, 2014

(54) METHOD FOR DETERMINING THE QUALITY OF A PROFESSIONAL

(75) Inventors: Mitchel Rothschild, Riverdale, NY (US); Christine Parlamis, Glen Rock, NJ (US); Todd Rosengart, Englewood, NJ (US)

(73) Assignee: MDX Medical, Inc., Lyndhurst, NJ (US)

( * ) Notice: Subject to any disclaimer, the term of this patent is extended or adjusted under 35 U.S.C. 154(b) by 515 days.

(21) Appl. No.: 12/046,566

(22) Filed: Mar. 12, 2008

Related U.S. Application Data

(63) Continuation of application No. 11/928,417, filed on Oct. 30, 2007.

(60) Provisional application No. 60/969,819, filed on Sep. 4, 2007.

(51) Int. Cl.
 *G06Q 30/00* (2012.01)
 *G06Q 10/00* (2012.01)

(52) U.S. Cl.
 USPC .............................. 705/347; 705/7.41; 705/2

(58) Field of Classification Search
 None
 See application file for complete search history.

(56) References Cited

U.S. PATENT DOCUMENTS

| | | | |
|---|---|---|---|
| 5,365,425 A | 11/1994 | Torma et al. | |
| 5,517,405 A | 5/1996 | McAndrew et al. | |
| 5,915,240 A | 6/1999 | Karpf | |
| 6,014,629 A | 1/2000 | DeBruin-Ashton | |
| 6,029,138 A | 2/2000 | Khorasani et al. | |
| 6,081,786 A | 6/2000 | Barry et al. | |
| 6,088,677 A | 7/2000 | Spurgeon | |
| 6,108,635 A | 8/2000 | Herren et al. | |
| 6,188,988 B1 | 2/2001 | Barry et al. | |
| 6,584,445 B2 | 6/2003 | Papageorge | |
| 6,658,431 B1 | 12/2003 | Norman, Jr. | |
| 6,671,714 B1 | 12/2003 | Weyer et al. | |
| 6,697,783 B1 | 2/2004 | Brinkman et al. | |
| 6,735,568 B1 * | 5/2004 | Buckwalter et al. | 705/319 |
| 6,738,754 B1 | 5/2004 | Norman, Jr. | |
| 7,065,528 B2 | 6/2006 | Herz et al. | |
| 7,383,197 B1 | 6/2008 | Neuman | |
| 2001/0039547 A1 | 11/2001 | Black et al. | |

(Continued)

OTHER PUBLICATIONS

Roehrig Susan M. "Prediction of Licensing Examination Scores in Physical Therapy Graduates." Phys Ther. 1988; 68: pp. 694-698. Retrieved from http://physther.org/content/68/5/694.full.pdf.*
Bowman James S., Chen Fiona F., Tinkersley William B. and Hilliard Karen R. (1993). "Patterns in MPA Decision-Making: An Application of Social Judgment Theory." Public Admin Quart 17: 356-372. Retrieved from http://uwf.edu/wtankers/resources/Tankersley5.pdf.*

(Continued)

*Primary Examiner* — Jonathan Ouellette
*Assistant Examiner* — Maame Ofori-Awuah
(74) *Attorney, Agent, or Firm* — Leydig, Voit & Mayer, Ltd.

(57) ABSTRACT

A method of predicting a quality of a professional based on quality measures of the professional is provided. The method includes collecting recommendations associated with the professional and determining an independent variable for the professional based on the recommendations received for the professional. Here, the independent variable reflects the quality of the professional. The method also includes comparing the independent variable with quality measures associated with the professional and generating a model based on the comparison between the independent variable and the quality measures. The model associates each of the quality measures with the quality of the professional. Particularly, the model assigns a weight to each of the quality measures based on the probativeness of the quality measure in relation to the quality of the professional. Thus, the quality measure of the professional may be used to determine the overall quality of the professional.

24 Claims, 6 Drawing Sheets

(56) References Cited

U.S. PATENT DOCUMENTS

| | | | |
|---|---|---|---|
| 2002/0013836 A1* | 1/2002 | Friedman et al. | 709/223 |
| 2002/0038233 A1 | 3/2002 | Shubov et al. | |
| 2002/0046041 A1 | 4/2002 | Lang | |
| 2002/0059201 A1 | 5/2002 | Work | |
| 2003/0028406 A1 | 2/2003 | Herz et al. | |
| 2003/0093294 A1 | 5/2003 | Passantino | |
| 2003/0195838 A1 | 10/2003 | Henley | |
| 2004/0010423 A1 | 1/2004 | Sameh | |
| 2004/0053203 A1* | 3/2004 | Walters et al. | 434/350 |
| 2004/0064440 A1 | 4/2004 | Norman, Jr. | |
| 2004/0172282 A1 | 9/2004 | Benja-Athon | |
| 2004/0193447 A1 | 9/2004 | Joseph | |
| 2004/0260666 A1 | 12/2004 | Pestotnik et al. | |
| 2005/0071189 A1 | 3/2005 | Blake et al. | |
| 2005/0114279 A1* | 5/2005 | Scarborough et al. | 706/21 |
| 2005/0149507 A1 | 7/2005 | Nye | |
| 2006/0015369 A1 | 1/2006 | Bachus et al. | |
| 2006/0080146 A1 | 4/2006 | Cook et al. | |
| 2006/0161456 A1 | 7/2006 | Baker et al. | |
| 2006/0229902 A1 | 10/2006 | McGovern et al. | |
| 2006/0294138 A1 | 12/2006 | Stolba | |
| 2007/0094044 A1 | 4/2007 | Stone et al. | |
| 2007/0156455 A1 | 7/2007 | Tarino et al. | |
| 2008/0140680 A1* | 6/2008 | Hyder et al. | 707/100 |

OTHER PUBLICATIONS

Callan, Clara et al "Validity of Faculty Ratings of Students' Clinical Competence in Core Clerkships in Relation to Scores on Licensing Examinations and Supervisors' Ratings in Residency" Academic Medicine: Oct. 2000—vol. 75—Issue 10—p. S71-S73.* http://www.vitals.com; [retrieved on Mar. 16, 2011; and archived Dec. 15, 2007] Copyright 2007, 1 page.

http://www.healthgrades.com; [retrieved on Mar. 16, 2011; and archived Sep. 30, 2007] Copyright 2007, pp. 1-5.

http://www.ingenix.com; [retrieved on Mar. 16, 2011] Copyright 2011, pp. 1-2.

http://www.webmd.com; [retrieved on Mar. 16, 2011 and archived on Sep. 30, 2007, 1-6 pages.

http://www.webmd.com; [retrieved on Mar. 16, 2011 and archived on Sep. 30, 2007] Copyright 2007, pp. 1-2.

http://www.ucomparehealthcare.com; [retrieved on Mar. 16, 2011 and archived on Sep. 30, 2007] Copyright 2007, pp. 1-2.

http://www.revolutionhealth.com; [retrieved on Mar. 16, 2011 and archived on Sep. 29, 2007] Copyright 2007, 1 page.

http://www.revolutionhealth.com; [retrieved on Mar. 16, 2011 and archived on Sep. 23, 2007] Copyright 2007, 1 page.

http://www.ingenix.com; [retrieved on Mar. 16, 2011] Copyright 2011, 1 page.

* cited by examiner

MEDICAL PROFESSIONAL COMPARISON

| Medical Professional A | Quality Measure Value | Quality Measure Weight | Weighted Quality Measures |
|---|---|---|---|
| Years of Experience, Surgeons | 2 | 33.33% | 0.67 |
| Quality of MDs Training | 2 | 25.00% | 0.50 |
| Quality of Hospital Affiliation | 4 | 25.00% | 1.00 |
| Less travel for me | 4 | 16.67% | 0.67 |
| Dr A Match Score | | | 2.83 |

| Medical Professional B | Quality Measure Value | Quality Measure Weight | Weighted Quality Measures |
|---|---|---|---|
| Years of Experience, Surgeons | 4 | 33.33% | 1.33 |
| Quality of MDs Training | 4 | 25.00% | 1.00 |
| Quality of Hospital Affiliation | 1 | 25.00% | 0.25 |
| Less travel for me | 1 | 16.67% | 0.17 |
| Dr B Match Score | | | 2.75 |

*FIG. 4* home   check up on your doctor   find a doctor   rate a doctor                      login: consumer/physician

Summary profiles are shown below                                                ( Modify search )

Click on a doctor's name to see the full profile.

| Medical Professional A ⟋340 | Medical Professional B ⟋342 | Medical Professional C ⟋344 |
|---|---|---|
| (go) Family Practitioner | (go) Family Practitioner | (go) Family Practitioner |
| Male-Age 50-22 years experience<br>Faugno Gerald MD<br>150 Ridge Rd<br>Lyndhurst, NJ  07071<br>(201) 933-1480<br>Dr. Faugno has 1 additional add.. | Male-52 years experience<br>Dr. Buccini<br>190 Orient Way<br>Rutherford, NJ  07070 | Male-Age 51-21 years experience<br>Angelo R. Racaniello, MD<br>152 Sylvan St<br>Rutherford, NJ  07070 |
| Specialty                    Status:<br>Board certified               ✓<br>Family Medicine<br>Special Expertise:  Array | Specialty                    Status:<br>Board certified               ✓<br>Family Medicine<br>Special Expertise: Array | Specialty                    Status:<br>Board certified               ✓<br>Family Medicine<br>Special Expertise:  Array |
| Hospital Affiliation<br>Pbl Regional Medical<br>Center, Passaic | Hospital Affiliation           Rating:<br>Beth Israel Hosp-<br>Passaic, Passaic<br>Meadowlands Hospital Medical Center<br>55 Meadowlands Pkwy,  ★★★☆<br>Secaucus, NJ 07094 | Hospital Affiliation<br>*No information supplied.* |
| Hospital quality is often a reflection<br>of the doctors associated with it. | Hospital quality is often a reflection<br>of the doctors associated with it. | |
| Education<br>Medical School<br>Universidad Central Del Este (Uce),<br>San Pedro De Marcoris, Dominican<br>Republic<br>Graduated: 1981<br><br>Graduate Medical Education<br>NY Med Coll/met Hosp Ctr<br>Graduated: 1983<br>St. Mary Hosp<br>Graduated: 1986 | Education<br>Medical School<br>Chicago College of<br>Osteopathic Medicine  ★★★☆<br>Graduated: 1951 | Education<br>Medical School<br>University Central Del Este (Uce)<br>Graduated: 1982<br><br><br>Graduate Medical Education<br>Genesys Reg M C-St Joseph Cp<br>Graduated: 1984<br>Genesys Reg M C-St Joseph Cp<br>Graduated: 1986 |
| Disciplinary Information<br>License Status   Active  Status: ✓<br>Sanctions &  No sanction<br>Actions         data found<br>Malpractice      0 found | Disciplinary Information<br>License Status   Active  Status: ✓<br>Sanctions &  No sanction<br>Actions         data found<br>Malpractice      0 found | Disciplinary Information<br>License Status   Active  Status: ✓<br>Sanctions &  No sanction<br>Actions         data found<br>Malpractice      1 found |
| Insurance<br>Aetna Health, Inc. Aetna Life Insurance<br>Company, Cigna Healthcare of New<br>Jersey, Inc., Health Net of New Jersey,<br>Inc., Horizon Blue Cross Blue Shield Of<br>NJ, Horizon Healthcare of NJ HMO Blue, | Insurance<br>*No information supplied.* | Insurance<br>*No information supplied.* |

*FIG. 5*

METHOD FOR DETERMINING THE QUALITY OF A PROFESSIONAL

CROSS-REFERENCE TO RELATED APPLICATION

The present application is a continuation of U.S. patent application Ser. No. 11/928,417, filed on Oct. 30, 2007, entitled "SYSTEM AND METHOD FOR SEARCHING FOR A PROFESSIONAL," which claims the benefit of U.S. Provisional Application Ser. No. 60/969,819, filed Sep. 4, 2007, entitled "METHOD AND SYSTEM FOR FORMING AN INFORMATION DATABASE," the disclosures of which are hereby incorporated by reference in their entireties.

FIELD OF THE INVENTION

The present invention relates to generating a predictive model of the quality of a professional and more particularly to method of developing a predictive model which may be used to determine the quality of health care provided by a medical professional.

BACKGROUND OF THE INVENTION

Often times, when a person seeks a medical professional, the person relies on the recommendations of others, such as friends, family members, co-workers, or the like. The person may refer to the phone book, a search on the Internet, or other directory resources in order to find a professional. However, if a person wishes to find a qualified medical professional who has a good standard of care, the person's options are limited.

The recommendations received from acquaintances and the listing of medical professionals gleaned from directory resources does not qualify the medical professional. More specifically, these methodologies do not inform the person of the quality of care of a particular medical professional. As a result, often times, a person does not have any idea of the quality of a medical professional when the person has an initial appointment with the medical professional. Thus, the person runs the risk of having an appointment with, and sharing personal health information with, a medical professional who the person ultimately may believe does not provide the quality of care the person is seeking. Even worse, the person may end up receiving medical care, which is more detrimental than beneficial to his/her health.

Accordingly, a need exists to determine the quality of a medical professional prior to a person patronizing the services of the medical professional. The method should provide a way to determine the quality of care offered by a medical professional based on a few facts associated with the medical professional.

SUMMARY OF THE INVENTION

The present invention provides a method for predicting the quality of a professional based on various quality measures associated with the professional. In particular, the present invention provides a model, which may be used to determine the quality of the professional based on various quality measures associated with the professional. Initially, an independent objective measure, which indicates the quality of the professional, is ascertained. Various quality measures associated with the professional are also tabulated. The various quality measures are then statistically correlated with the independent objective measure to determine the relative importance of individual quality measures. Using the relative importance of the individual quality measures, the model may be generated which may determine the quality of the professional based on the quality measures of the professional. Specifically, different quality measures are accorded different weights based on the statistical correlation of the quality measures with the independent variable. Thus, the present invention determines the probative value of a particular quality measure in assessing an overall quality of the professional based on the quality measure.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 illustrates the computation of a match score in accordance with an embodiment of the present invention.

FIG. 5 illustrates a comparison of medical professionals in accordance with an embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a method for predicting the quality of a professional based on various quality measures associated with the professional. More specifically, a model, which may be used to determine the quality of the professional based on various quality measures associated with the professional, is provided. Initially, an independent objective measure is ascertained, where the independent objective measure indicates the quality of the professional. Additionally, various quality measures associated with the professional are tabulated. The quality measures are then statistically correlated with the independent objective measure to determine the relative importance of individual quality measures. Using the relative importance of the individual quality measures, the model may be generated, which may determine the quality of the professional based on the quality measures of the professional. Specifically, different quality measures are accorded different weights based on the statistical correlation of the quality measures with the independent variable. Thus, the present invention determines the probative value of a particular quality measure in assessing an overall quality of the professional based on the quality measure. Furthermore, a model may be generated using the probative values of different quality measures.

Figure 1:
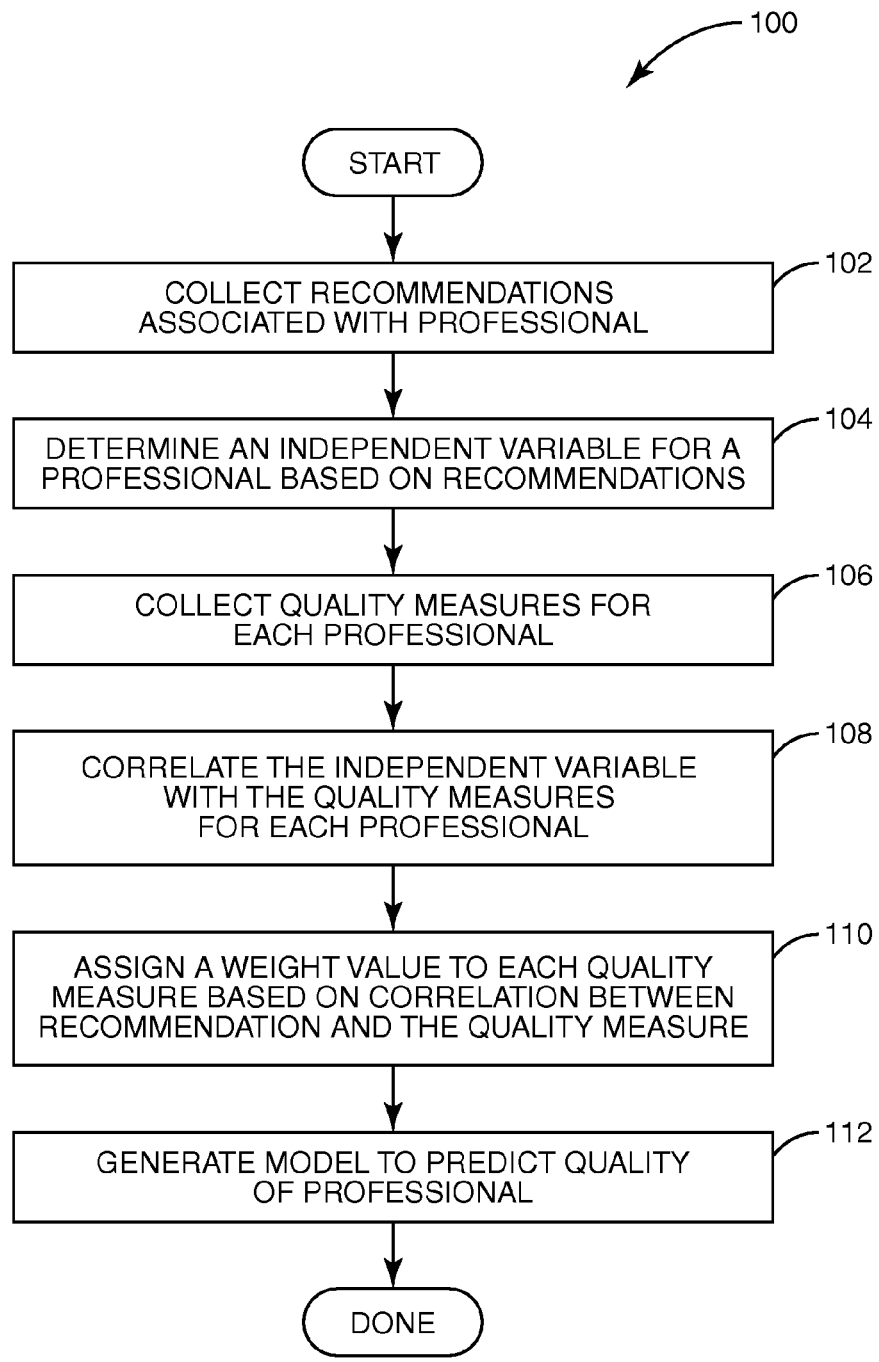
FIG. 1 illustrates a method of generating a model, which may be used to predict the quality of professionals in accordance with an embodiment of the present invention.

As illustrated in FIG. 1, a method 100 of generating a model, which may be used to predict the quality of professionals is illustrated in accordance with an embodiment of the present invention. As will be described in further detail, the model developed in the method 100 allows for determining the quality of a professional based on various quality measures associated with the professional. The quality of the professional may relate to the ability of the professional to render professional services. Examples of a professional who renders professional services may include a medical doctor who renders medical care to patients or an attorney who provides legal services.

Initially, in an operation 102, recommendations from various professionals regarding other professionals are collected. During the operation 102, professionals, such as doctors, are asked for recommendations regarding other doctors in their given specialty. To further illustrate, an oncologist may be asked to recommend another oncologist. The recommendations are collected in order to determine a score, or an independent variable, for a professional in an operation 104.

During the operation 104, a score for a professional is determined based on the recommendations for the professional received from other professionals. In accordance with an embodiment of the present invention, if a number of professionals recommend the same professional, it is assumed that since the same professional has been repeatedly recommended, the professional is a high quality professional. An example of a high quality professional may include, in instances where the professional is a doctor, a doctor who consistently provides a good standard of care for his/her patients. In an embodiment where the professional is an attorney, an example of a high quality attorney is an attorney who consistently obtains favorable results for his/her clients. Thus, the more recommendations a professional receives, the higher the quality of the professional.

In addition to being based on the number of recommendations a professional receives, the score may take into account a number of factors related to the recommendations, such as the quality of the recommendations, the quality of the people making the recommendations, the how recent the recommendation was made, and the like. The quality of the recommendation may relate to the professional making the recommendation. A higher quality recommendation may be defined as a recommendation from a professional who has a greater amount of professional recognition. To further illustrate, in an example where medical professionals are making recommendations, a dean of a medical school or a chief of a hospital may be considered to have a great amount of professional recognition due to their respective positions of being a dean or a chief. Accordingly, a recommendation from either a medical school dean or a hospital chief is considered to be a higher quality recommendation. Therefore, if a professional receives a high number of high quality recommendations in addition to a high number of recommendations, the professional will receive a higher score.

The score may be a numerical value within a range of numerical values, such as from about 0 to about 1000. In an embodiment of the present invention where the score is within the numerical range of about 0 to about 1000, a high quality score may be in the numerical range from about 800 to about 1000. Furthermore, if a professional has a mediocre score, the mediocre score is indicative of a professional who has average skills in his/her profession. A mediocre score may be in a numerical range between about 500 and about 800. Alternatively, the score may correspond to where the professional ranks in comparison to other professionals. Particularly, the score of a professional may correspond to a percentile ranking relative to other professionals, i.e., upper twentieth percentile for a high quality professional. In either embodiment, the score corresponds to an independent variable, which, as will be detailed further on, may be used to correlate various quality measures associated with a professional to the overall quality of a professional.

After the score is determined in the operation 104, quality measures for the professionals who received the independent variable in the operation 104 are collected in an operation 106. In accordance with an embodiment of the present invention, a quality measure may include any type of metric associated with a professional. To further illustrate, in an example where the quality measures pertain to a medical professional, the quality measures may include, but are not limited to, a specialty and any subspecialty or expertise associated with the specialty, the educational background of the medical professional, organizations that the medical professional is associated with, any disciplinary action against the medical professional, and the like. In addition, the quality measures may include quality of training of the medical professional, whether or not the medical professional completed any fellowships, the years of experience of the medical professional, and the like. The various quality measures may also include any hospitals with which the medical professional is associated, any awards or distinctions the medical professional has received, any publications by the medical professional, any board certifications, or the like. Furthermore, the quality measures may also include the preferences.

Additionally, the quality measures may be assigned a value based on the strength of the quality measure. To further illustrate, if a medical professional attended a top ten medical school, this quality measure is assigned a higher value than if the medical professional attended a medical school which was not a top ten medical school. Moreover, if a medical professional has twenty years of experience, this quality measure associated with the medical professional is assigned a higher value than if the medical professional has five years of experience. As a further example, if a medical professional is associated with a highly regarded hospital, such as a hospital noted for a particular specialty, as one of the quality measures, this quality measure is given a higher value. Any type of value system may be used in assigning values to a quality measure. For example, the quality measure values assigned to each quality measure may be a numerical value in a numerical range of about 1 to about 4 where one is the lowest value assigned to a quality measure and 4 is the highest value assigned to a quality measure.

Once the quality measures for the professionals are collected, the independent variables associated with the professionals are correlated with the quality measures for the professionals in order to determine the relative importance of the various quality measures in an operation 108. The correlations may be made using any number of techniques, such as a statistical correlation tool or any type of method, which defines a correlation between a range of dependent variables and an independent variable. Examples of statistical analysis tools which, may be used include regression analysis, chi-square distribution, or the like.

During the operation 108, quality measures, which may be probative of the quality of the professional are determined. Particularly, the quality measures of high quality professionals, such as professionals having a high score, are reviewed and common quality measures of the high quality professionals are determined in the operation 108. To further illustrate, if high quality professionals have all completed fellowships and have attended top ten medical schools, according to the present invention, a correlation exists between the medical school a medical professional has attended, whether or not a medical professional has completed a fellowship, and the quality of a medical professional. Thus, if a medical professional has attended a top ten medical school and has completed a fellowship, there is a strong likelihood that the medical professional will be a high quality medical professional.

Furthermore, during the operation 108, commonalities among both high quality and low quality medical professionals may also be determined. To further illustrate, if both high quality medical professionals and low quality medical professionals are board certified, this determination will be made during the operation 108. As such, in this scenario, whether or not a medical professional is board certified is not probative of the quality of a medical professional.

Once it is determined what quality measures are probative of a high quality professional and what quality measures are not probative of a high quality professional, these quality measures may be assigned a weight based on their probative value in an operation 110, as illustrated in FIG. 1. In the operation 110, the method 100 assigns weight values to different quality measures. The weight values are assigned to the quality measures based on the relationship between the quality measure and the quality of a professional having the quality measure. More specifically, quality measures which are probative of a high quality professional are given greater weight. To further illustrate, in the example noted above, medical professionals having attended a top ten medical school and having completed a fellowship are typically higher quality medical professionals. Accordingly, in this example, the medical school attended by the doctor is probative and this quality measure is assigned a higher weight. Similarly, if a medical professional has completed a fellowship, this quality measure is assigned a higher weight. In addition, if a medical professional is board certified, this quality measure is assigned little weight since, in this example, board certification is not probative of the quality of the professional. It should be noted that all quality measures associated with a professional are correlated with the quality of the professional. Therefore, all quality measures are assigned a weight depending on the probative value of the quality measure in relation to the quality of the professional having the quality measure.

Once individual quality measures are assigned relative weights in the operation 110, a model, which predicts the quality of a professional is generated in an operation 112. In an embodiment of the present invention, the model may be a linear formula, which assigns various weights to various quality measures where individual quality measures are multiplied by a factor indicative of the relative importance of the quality measure. If a quality measure is more probative of a high quality professional, this quality measure has a greater weight and accordingly a higher factor. Thus, using this model, the overall quality of a professional may be determined based on the quality measures associated with the professional.

An example of a model is as follows:

$$5*(QM_1)+5*(QM_2)+1*(QM_3)+\ldots X*(QM_n)=\text{The Quality Score of a Professional.}$$

In this example, $QM_1$ through $QM_n$ are numerical values corresponding to the aforementioned value of the quality measure. $QM_1$ may correspond to the medical school attended by the professional and $QM_2$ may correspond to whether or not the professional completed a fellowship. Furthermore, $QM_3$ may correspond to whether or not the professional is board certified. As mentioned above, the quality measures of medical school and whether or not the professional completed a fellowship were deemed as being probative of a high quality professional. Additionally, as mentioned above, the quality measure of board certification was deemed as being less probative. Thus, the quality measures of medical school attended and fellowships completed are accorded a higher weight, i.e., a factor of five, versus the quality measure of board certification, which is given less weight, i.e., a factor of one.

Furthermore, as discussed above, various quality measures are assigned a value, such as, in the example where the professional is a medical professional, the medical school attended. Thus, if a medical professional has a high value associated with this quality measure, i.e., the medical professional attended a top ten medical school, the medical professional will have a higher quality score than a medical professional who attended a medical school that is not a top ten medical school and therefore has a lower value.

In accordance with an embodiment of the present invention, the quality scores of various professionals calculated using the above-referenced model may be stored in a database. Furthermore, the previously described quality measure values may also be stored in the same database. As will be detailed further on, this database of quality scores of the professionals and quality measure values of quality measures associated with the professional stored therein may be used in finding a professional for a user.

Figure 2:
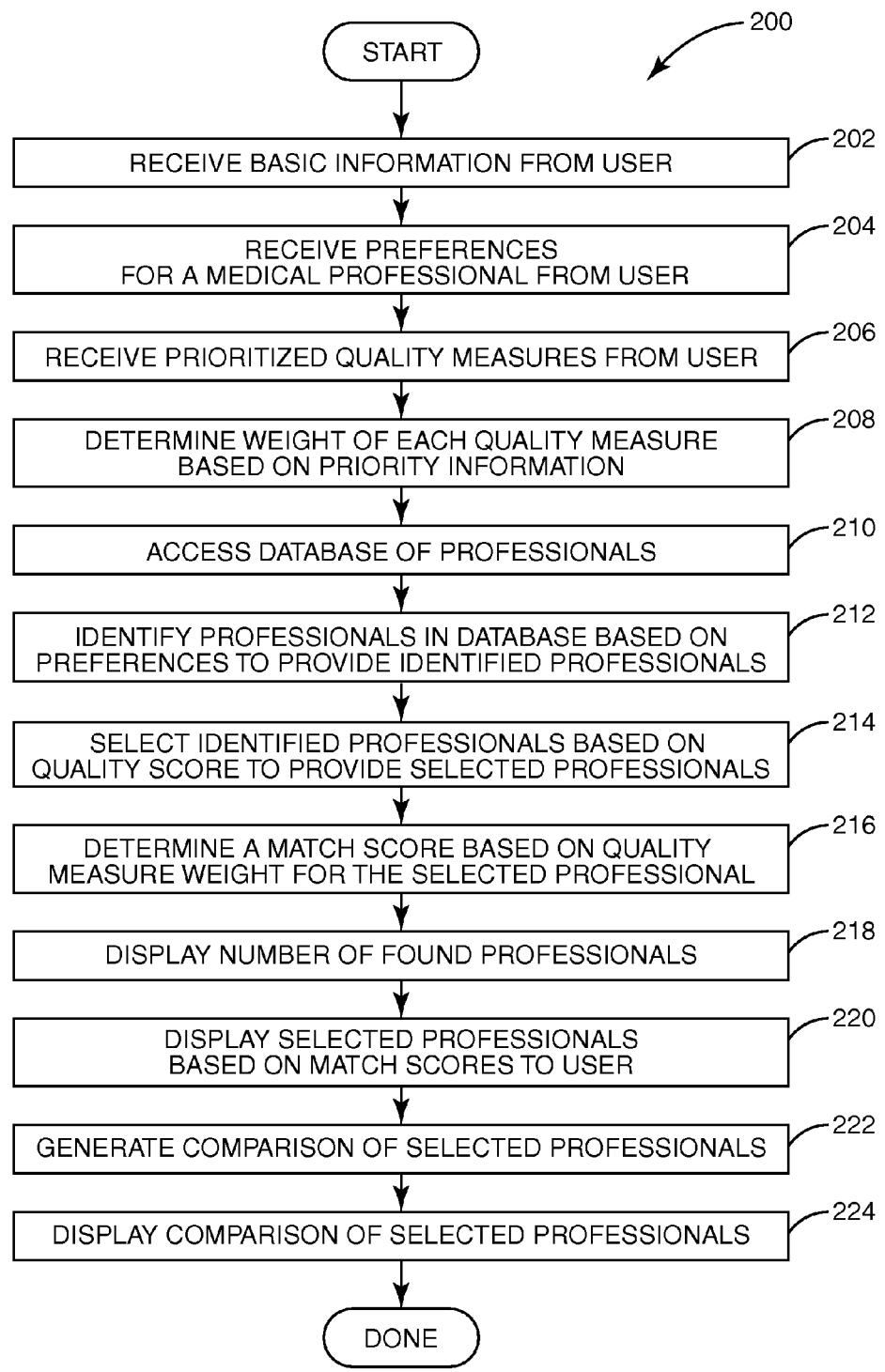
FIG. 2 shows a method of searching for a medical professional in accordance with an embodiment of the present invention.

Using the quality scores and the quality measure values of professionals described with reference to FIG. 1, a user may search for a medical professional, as shown in FIG. 2. FIG. 2 illustrates a method 200 of searching for a professional in accordance with an embodiment of the present invention. Initially, basic information about what type of professional a person is seeking and basic information about his/herself which may be used to assist in locating a professional is received in an operation 202. The type of professional may include, in instances where the user is searching for a doctor, a specialty and any subspecialty or expertise associated with the specialty. The information about the user is information, which may be used to assist in locating a medical professional, such as where the user is located, or the like.

Figure 3:
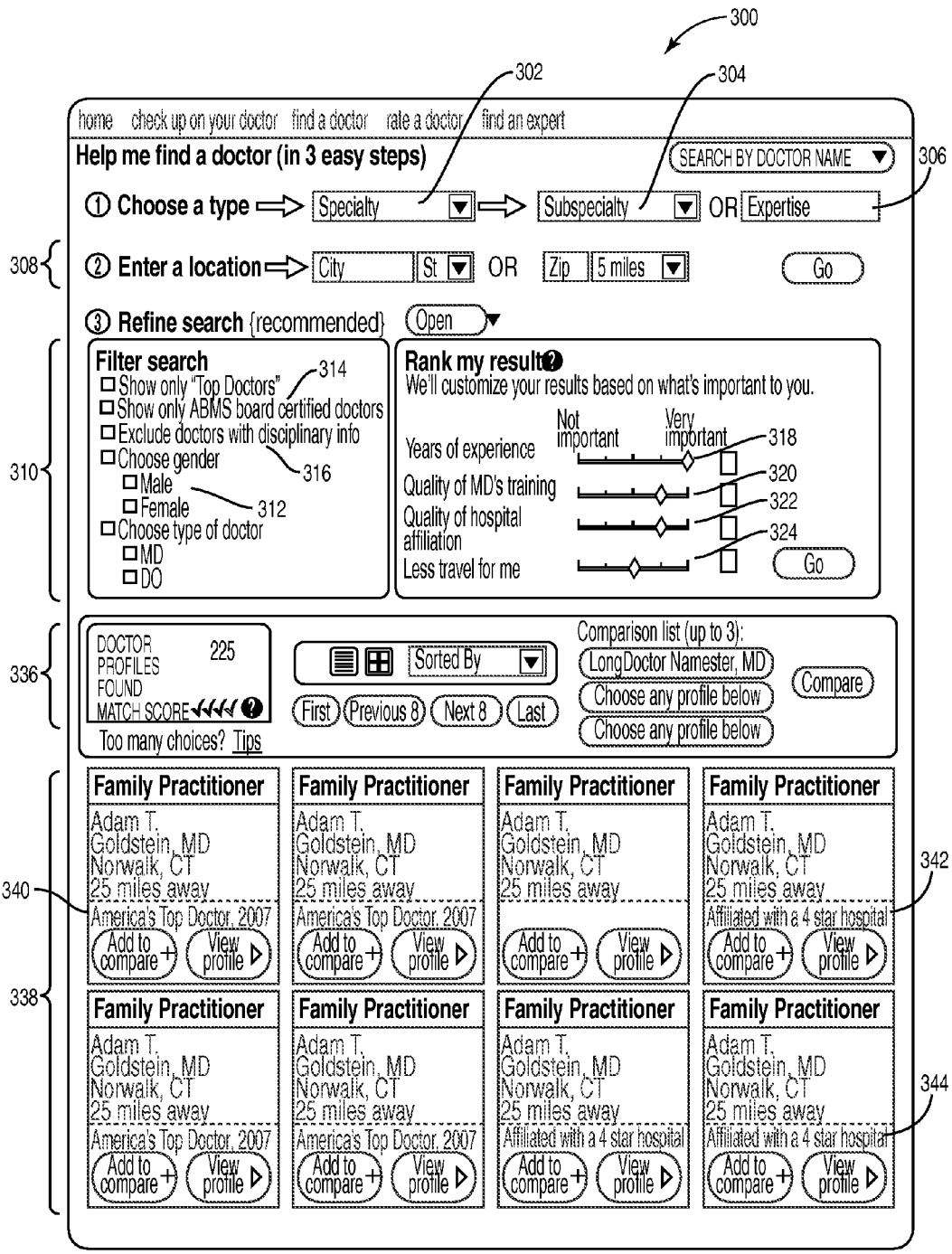
FIG. 3 shows a graphical user interface (GUI) which may be used to input data in accordance with an embodiment of the present invention.

The user may enter this information using a graphical user interface (GUI) 300, as shown in FIG. 3. The user enters information regarding a specialty of a professional at an interface 302 and subspecialties or expertise relating to the specialty at interfaces 304 and 306 during the operation 202. In addition, the user enters information about his/herself at the interface 308. For example, although not shown, a user enters the specialty of surgery at the interface 302 and enters his/her location as being in New York at the interface 308.

With reference to FIG. 2, after receiving basic information, preferences for a professional are received in an operation 204. The preferences may include any number of characteristics associated with the professional. These may include, but are not limited to, the gender of the professional, any Board certifications of the professional, and the language proficiency of the professional, such as the ability to speak foreign languages or communicate with others using means other than verbal communications. The preferences may also include a location of the professional, whether or not the professional has been subject to any disciplinary actions, any fellowships the professional may have obtained, whether the professional has evening or weekend hours, or the like.

The preferences may be received in a binary format from a user with the GUI 300, as shown in FIG. 3. Specifically, the user may enter his/her preferences at an interface 310 on the GUI 300 where the user may select various preferences of a medical professional. As may be seen in FIG. 3, the interface 310 provides a number of preferences for a user relating to a professional, such as gender 314, instances where the professional is a medical professional, "Top Doctor," whether or not the medical professional has been subject to any disciplinary actions 316, and whether or not the medical professional is American Board of Medical Specialities (ABMS) certified 314. In accordance with embodiments of the present invention, the interface 310 may include any number of preferences, such as the preferences discussed above.

Returning to the example, the user decides that he/she wants a medical professional who is male. Therefore, the user selects this preference at the interface 312, which indicates that the medical professional should be a male. Moreover, in the example, the user prefers that the medical professional be ABMS certified and that no disciplinary actions have occurred against the medical professional. Thus, in the example, the user selects these preferences at interfaces 314 and 316, respectively. It should be noted that while the interfaces 312-316 have been described at the interface 310 to have the preferences noted above, the interface 310 may include any number and combination of preferences.

Returning to FIG. 2, once the user enters the preferences for a medical professional, prioritized quality measures associated with the medical professional are received from a user in an operation 206. The ability to prioritize various quality measures gives texture to what would otherwise be a binary search where prioritizing various quality measures acts as a further filter in finding medical professionals which may be suitable for the user. More specifically, the operation 206 allows for further customization of the search for medical professionals based on specific desires of the user. Thus, if a user decides that the experience level of a medical professional is important, the user assigns a relatively high priority to this quality measure. Furthermore, if the user decides that the location of the medical professional is less important, the user assigns a low priority to this quality measure. The user prioritizes a quality measure by assigning a point value to the quality measure. The user may prioritize various quality measures using slider bars 318-324 of the GUI 300, as shown in FIG. 3.

With reference to FIG. 3 and the example, if the user decides that the number of years a medical professional has been practicing is very important, the user may use the slider bar 318 to assign the quality measure of years of experience a higher priority, as shown in FIG. 3. Particularly, the user has assigned a numerical value of four, as indicated by the gradations on the slider bar, to the quality measure of number of years of experience. Additionally, if the user decides that the quality measures of training and hospitals with which the medical professional is associated are important but not as important as the quality measure of years of experience, then the user may use the slider bars 320 and 322 to prioritize these quality measures, as shown in FIG. 3. As may be seen in FIG. 3, the user has assigned a numerical value of three, as indicated by the gradations on the slider bar, to each of these quality measures. Moreover, if the user decides that the location of the medical professional is not as important as the other quality measures, the user may assign a lower priority, such as the numerical value of two, as indicated by the gradations on the slider bar, to this quality measure using the slider bar 324, as shown in FIG. 3.

The numerical values will be used to determine a weight of each quality measure based on the priority information in an operation 208 of FIG. 2. The weight of each quality measure is determined by summing the values assigned to each quality measure and then dividing the numerical value of each quality measure by the sum of all the numerical values. To further illustrate, turning back to the example, the user assigned a numerical value of four to the quality measure of number of years of experience and a numerical value of three to the quality measures of training and hospital associations. The user also assigned a numerical value of two to the quality measure of the location of a medical professional. Thus, the sum of these values is 12 (4+3+3+2). Therefore, the weight of the quality measure years of experience is 4/12, or thirty-three and one third percent. The weight of the quality measures training and hospital associations is 3/12, or twenty-five percent, and the weight of the quality measure location is 2/12, or sixteen and two-thirds percent.

As outlined in FIG. 2, after the weights of each quality measure using the priority information is determined in an operation 208, the method 200 accesses a database of professionals in order to search for professionals having the preferences and the quality measures selected by the user in an operation 210. Turning back to the example, the method accesses the database described above having the quality scores and the quality measure values stored therein. After accessing the database, the method 200 performs an operation 212.

During the operation 212, professionals within the database are identified based on the preferences received in the operation 206 in order to provide identified professionals. The professionals are identified according to a number of factors. In one embodiment, the professionals are identified by the preferences and the quality measures selected by the user in the operations 204 and 206. After the professionals are identified in the operation 212, the method 200 selects the identified professionals who match the preferences selected by the user by selecting the professionals who have a quality score within a defined threshold to provide selected professionals in an operation 214. In one embodiment, the defined threshold may be in a range between about a seventieth percentile and about the hundredth percentile of the professionals who fit the preferences selected by the user. More specifically, medical professionals who are in a seventieth percentile in relation to their peers will be presented to the user. Alternatively, in an embodiment where the quality score is in a range between about 0 and about 1000, the defined threshold may be in a range between about 700 and about 1000. Thus, professionals who are in this range will be presented to the user.

Turning back to the example, medical professionals in the medical professional database who are female, are not ABMS certified, and have had disciplinary actions against them are culled in accordance with preferences selected by the user during the operation 212. Additionally, medical professionals who do not specialize in surgery, as indicated by the user in the interface 302, are removed. Of the medical professionals remaining, i.e., the medical professionals who are male, are ABMS certified, who have not had any disciplinary actions against them, and who specialize in surgery, those that are not in the upper thirtieth percentile will be filtered during the operation 214. In the example, the operation 214 finds 225 medical professionals who fit the preferences of the user and are within the acceptable quality score range.

After the medical professionals who have the preferences of the user and are within the defined threshold are found, a match score based on a quality measure weight for the selected professional is determined in an operation 216. During the operation 216, the method determines a match score for each of the professionals found during the operation 214 by multiplying the weights of the quality measures by the values associated with the quality measures of each professional. After the weights are multiplied by the quality measure values, these values are summed. The summed values correspond to the match score of the professional. During the operation 216, match scores for all the medical professionals found during the operations 210-214 are determined.

To further illustrate, an example of determining a match score of the professionals found in the example during the operations 212 and 214 is illustrated in FIG. 4. As shown at 326 of FIG. 4, the quality measure values of a medical professional A found during the operations 210-214 are two for the quality measures of years of experience and training and four for the quality measures of hospital affiliation and location. Therefore, as shown in FIG. 4, the match score for the medical professional is 2.83 where the respective quality measure values are multiplied by the weight of each quality measure, as determined in the operation 208. Specifically, quality measure values 328 are multiplied by weights of the quality measure 330 to result in weighted quality measures 332 and then summed which results in a value of 2.83, as shown in FIG. 4. In addition, a match score for a medical professional B found during the operations 210-214 is 2.75, as shown at 334 in FIG. 4.

Once the medical professionals to be presented to the user are found and the match scores are calculated in the operations 210-216, the number of medical professionals is tallied and then displayed to the user in an operation 218. Turning back to FIG. 3, in an embodiment of the present invention, the number of medical professionals which match the preferences of the user are shown in an interface 336 of the GUI 300. In the example, 225 medical professionals were found which match the preferences of the user and meet the threshold quality requirements, as shown in the interface 336.

After the number of found medical professionals is displayed in the operation 218, the selected professionals based on the match scores are displayed to the user in the operation 220. As mentioned above, during the operation 216, match scores of the found professionals are determined. The match scores are used to list the found professionals. In particular, the professionals may be listed in descending order starting with the professional having the highest match score to the professional having the lowest match score.

Turning back to the example and FIG. 3, as mentioned above, the found medical professionals are shown in a listing 338 of the GUI 300 in descending order. In the example, the medical professional A had the highest match score, thus, the medical professional A is listed at 340 of the listing 338. In addition, in the example, the medical professional B had the second highest score. Thus, the medical professional B is listed at 342. As the found medical professionals are listed in ascending order of match scores, the medical professional listed at 344 of the listing 338 has a match score which is less than the medical professionals A and B.

Returning to FIG. 2, once the medical professionals having a score which matches those of the user have been shown to the user, the user has the option of generating a comparison of the selected professionals in an operation 222 and then displaying the comparison of the selected professionals in an operation 224. The comparison will illustrate various quality measures of each medical professional in a graphical form such that the user may compare the various preferences along with the quality measures of each medical professional, which substantially meets those preferences of the user.

Turning back to the example, FIG. 5 illustrates a comparison of medical professionals, such as medical professionals A and B, in accordance with an embodiment of the present invention. As may be seen in FIG. 5, a side-by-side comparison of medical professionals who have the preferences of the user and have quality measures, such as education, disciplinary actions, and the like, which meet the relative importance of the user is output. Using this comparison, the user may determine which medical professional best suits his/her needs based on the user's preferences and the relative importance the user has assigned to the various quality measures associated with the medical professional.

Figure 6:
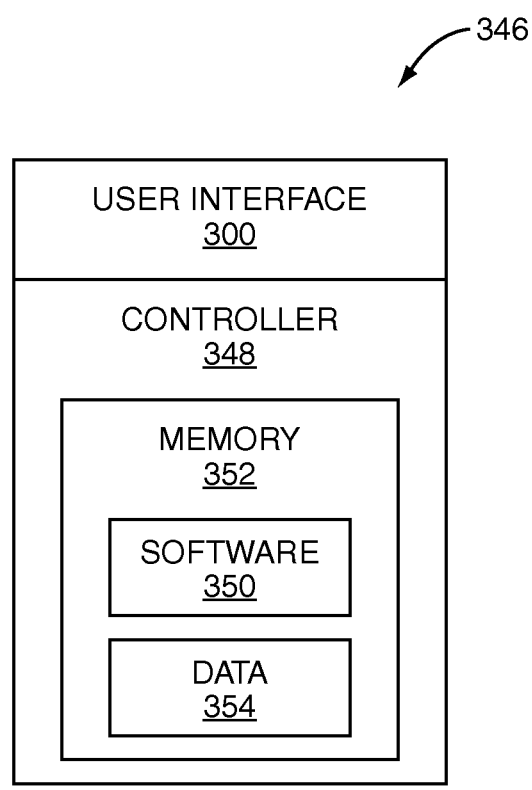
FIG. 6 shows a block representation of a system, which may be used to search for a professional in accordance with an embodiment of the present invention.

Turning now to FIG. 6, a block representation of a system 346 which may be used to search for a professional is shown. The system 346 includes the GUI 300 along with a controller 348. The controller 348 is adapted to control software 350 within the memory 352. In addition, the controller 348 may be adapted to, via the software 350, determine an overall quality score for a professional using the method 100 as previously discussed. Particularly, the controller 348 is adapted to determine an independent variable for a professional and correlate the independent variable with quality measures of the professional. Furthermore, the controller 348 is adapted to assign a weight value to each of the quality measures based on the correlation between a recommendation of the professional and the quality measure. The controller 348 is also adapted to generate a model, which may be used to predict the quality of a professional.

The controller 348 may be adapted to receive data 354 received from a user, such as the previously discussed basic information and prioritized quality measures. The controller 348 may be adapted to determine a quality measure weight of quality measures associated with a professional based on the priority information received from a user and identify professionals stored on a database of the system 346 based on the preferences. Furthermore, the controller 348 may be adapted to select identified professionals based on a quality score and determine a match score based on the quality measure weight and display the selected professionals based on the match scores. The system 346 may be adapted to generate a comparison of selected professionals and display the comparison of the selected professionals to a user.

Those skilled in the art will recognize improvements and modifications to the preferred embodiments of the present invention. All such improvements and modifications are considered within the scope of the concepts disclosed herein and the claims that follow.

What is claimed is:

1. A system for generating a modeled quality score for a medical professional record, the system comprising:
   an electronic database maintaining medical professional records, each medical professional record including fields for storing:
      a medical professional identification,
      a quality score consisting of a single overall quality value, and
      quality measures specifying at least:
         distinctions received, and
         quality of training;
   a non-transitory memory storing computer-executable instructions; and a controller in communication with the non-transitory memory having a processor configured to execute the computer-executable instructions to perform the steps of:
  collecting recommendations associated with identified medical professionals;
  determining, for individual ones of the medical professionals based on the recommendations received for each of the medical professionals, the quality score consisting of the single overall quality value being based on a quantity of recommendations registered for a medical professional corresponding to the medical professional identification, and at least one of the following:
    (1) a quality of the recommendations received for the medical professional,
    (2) a professionally recognized professional giving the recommendation and
    (3) how recent the recommendations were given;
  collecting at least two quality measures for the medical professional records;
  assigning an individual value to each one of the at least two quality measures for the medical professional records, the individual value being based on a strength of each one of the at least two quality measures for a particular medical professional;
  correlating the quality score consisting of the single overall quality value associated with each of the medical professional records with the individual values for the at least two quality measures for each of the corresponding individual medical professional records to render a degree of correlation value for each of the at least two quality measures in relation to the quality score consisting of the single overall quality value;
  assigning a weight to each of the at least two quality measures based on the degree of correlation value for each of the at least two quality measures;
  generating a modeled quality score for individual ones of the medical professional records, each modeled quality score for a professional record being based upon a summation, for each individual one of the at least two quality measures for a medical professional record, of product of:
    a value assigned to the individual one of the at least two quality measures, and
    a weight assigned to the individual one of the at least two quality measures; and
  storing the modeled quality score, rendered during the generating, for individual ones of the medical professional records.

2. The system as recited in claim 1, wherein the at least two quality measures comprise: distinctions received and quality of training.

3. The system as recited in claim 2, wherein the at least two quality measures further comprise:
medical professional associations with organizations.

4. The system as recited in claim 3, wherein the recommendations received from other medical professionals are weighted.

5. The system as recited in claim 1, wherein the at least two quality measures comprise: an educational background of the professional, the years of professional experience of the professional, and disciplinary actions against the professional.

6. The system as recited in claim 1, wherein the at least two quality measures comprise: an association with an identified hospital.

7. The system as recited in claim 1, wherein the quality score consisting of the single overall quality value, for a particular medical professional record, represents an ability of a medical professional, corresponding to the particular medical professional record, to provide medical services to a patient.

8. The system as recited in claim 1, wherein the controller is further configured to perform the step of:
  comparing the quality score with corresponding quality measure values for individual ones of the medical professional records using a statistical correlation tool.

9. A method for generating a modeled quality score for a medical professional record, in a system comprising:
  an electronic database maintaining medical professional records, each medical professional record including fields for storing:
    a medical professional identification,
    a quality score consisting of a single overall quality value, and
    quality measures specifying at least:
      distinctions received, and
      quality of training;
  a non-transitory memory storing computer-executable instructions; and
  a controller in communication with the non-transitory memory having a processor configured to execute the computer-executable instructions, the method for generating a modeled quality score comprising:
    collecting recommendations associated with identified medical professionals;
    determining, for individual ones of the medical professionals based on the recommendations received for each of the medical professionals, the quality score consisting of the single overall quality value being based on a quantity of recommendations registered for a medical professional corresponding to the medical professional identification, and at least one of the following:
      (1) a quality of the recommendations received for the medical professional,
      (2) a professionally recognized professional giving the recommendation, and
      (3) how recent the recommendations were given;
    collecting at least two quality measures for the medical professional records;
    assigning an individual value to each one of the at least two quality measures for the medical professional records, the individual value being based on a strength of each one of the at least two quality measures for a particular medical professional;
    correlating the quality score consisting of the single overall quality value associated with each of the medical professional records with the individual values for the at least two quality measures for each of the corresponding individual medical professional records to render a degree of correlation value for each of the at least two quality measures in relation to the quality score consisting of the single overall quality value;
    assigning a weight to each of the at least two quality measures based on the degree of correlation value for each of the at least two quality measures;
    generating a modeled quality score for individual ones of the medical professional records, each modeled quality score for a professional record being based upon a summation, for each individual one of the at least two quality measures for a medical professional record, of product of:

a value assigned to the individual one of the at least two quality measures, and
a weight assigned to the individual one of the at least two quality measures; and
storing the modeled quality score, rendered during the generating, for individual ones of the medical professional records.

10. The method as recited in claim 9, wherein the at least two quality measures comprise: distinctions received and quality of training.

11. The method as recited in claim 10, wherein the at least two quality measures further comprise:
medical professional associations with organizations.

12. The method as recited in claim 11, wherein the recommendations received from other medical professionals are weighted.

13. The method as recited in claim 9, wherein the at least two quality measures comprise: an educational background of the professional, the years of professional experience of the professional, and disciplinary actions against the professional.

14. The method as recited in claim 9, wherein the at least two quality measures comprise: an association with an identified hospital.

15. The method as recited in claim 9, wherein the quality score consisting of the single overall quality value, for a particular medical professional record, represents an ability of a medical professional, corresponding to the particular medical professional record, to provide medical services to a patient.

16. The method as recited in claim 9, further comprising:
comparing the quality score with corresponding quality measure values for individual ones of the medical professional records using a statistical correlation tool.

17. A non-transitory computer-readable memory comprising computer executable instructions for performing a method for generating a modeled quality score for a medical professional record, in a system including:
an electronic database maintaining medical professional records, each medical professional record including fields for storing:
a medical professional identification,
a quality score consisting of a single overall quality value, and
quality measures specifying at least:
distinctions received, and
quality of training; and
a controller in communication with the non-transitory memory having a processor configured to execute the computer-executable instructions, the method for generating a modeled quality score comprising:
collecting recommendations associated with identified medical professionals;
determining, for individual ones of the medical professionals based on the recommendations received for each of the medical professionals, the quality score consisting of the single overall quality value being based on a quantity of recommendations registered for a medical professional corresponding to the medical professional identification, and at least one of the following:
(1) a quality of the recommendations received for the medical professional,
(2) a professionally recognized professional giving the recommendation, and
(3) how recent the recommendations were given;
collecting at least two quality measures for the medical professional records;
assigning an individual value to each one of the at least two quality measures for the medical professional records, the individual value being based on a strength of each one of the at least two quality measures for a particular medical professional;
correlating the quality score consisting of the single overall quality value associated with each of the medical professional records with the individual values for the at least two quality measures for each of the corresponding individual medical professional records to render a degree of correlation value for each of the at least two quality measures in relation to the quality score consisting of the single overall quality value;
assigning a weight to each of the at least two quality measures based on the degree of correlation value for each of the at least two quality measures;
generating a modeled quality score for individual ones of the medical professional records, each modeled quality score for a professional record being based upon a summation, for each individual one of the at least two quality measures for a medical professional record, of product of:
a value assigned to the individual one of the at least two quality measures, and
a weight assigned to the individual one of the at least two quality measures; and
storing the modeled quality score, rendered during the generating, for individual ones of the medical professional records.

18. The non-transitory computer-readable medium as recited in claim 17, wherein the at least two quality measures comprise: distinctions received and quality of training.

19. The non-transitory computer-readable medium as recited in claim 18, wherein the at least two quality measures further comprise:
medical professional associations with organizations.

20. The non-transitory computer-readable medium as recited in claim 19, wherein the recommendations received from other medical professionals are weighted.

21. The non-transitory computer-readable medium as recited in claim 17, wherein the at least two quality measures comprise: an educational background of the professional, the years of professional experience of the professional, and disciplinary actions against the professional.

22. The non-transitory computer-readable medium as recited in claim 17, wherein the at least two quality measures comprise: an association with an identified hospital.

23. The non-transitory computer-readable medium as recited in claim 17, wherein the quality score consisting of the single overall quality value, for a particular medical professional record, represents an ability of a medical professional, corresponding to the particular medical professional record, to provide medical services to a patient.

24. The non-transitory computer-readable medium as recited in claim 17, further comprising computer-executable instructions for:
comparing the quality score with corresponding quality measure values for individual ones of the medical professional records using a statistical correlation tool.

* * * * *